(12) United States Patent
Chowdhury et al.

(10) Patent No.: US 9,665,995 B2
(45) Date of Patent: May 30, 2017

(54) METHOD AND SYSTEM FOR PERFORMING CRASH ANALYSIS OF ONE OR MORE VEHICLES

(71) Applicant: Tata Consultancy Services Limited, Mumbai (IN)

(72) Inventors: Arijit Chowdhury, Kolkata (IN); Tapas Chakravarty, Kolkata (IN); Balamuralidhar Purushothaman, Bangalore (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/662,338

(22) Filed: Mar. 19, 2015

(65) Prior Publication Data

US 2016/0110931 A1 Apr. 21, 2016

(30) Foreign Application Priority Data

Oct. 18, 2014 (IN) .......................... 3331/MUM/2014

(51) Int. Cl.
*G07C 5/08* (2006.01)
*G01S 19/13* (2010.01)
*G07C 5/00* (2006.01)
*G08G 1/01* (2006.01)
*H04N 9/47* (2006.01)
*G01M 17/00* (2006.01)
(Continued)

(52) U.S. Cl.
CPC ................ *G07C 5/08* (2013.01); *G01S 19/13* (2013.01); *G07C 5/008* (2013.01); *G07C 5/085* (2013.01); *G08G 1/0112* (2013.01); *G08G 1/0133* (2013.01); *B60R 2021/0027* (2013.01); *B60R 2021/01325* (2013.01); *G01M 17/00* (2013.01); *H04N 9/47* (2013.01)

(58) Field of Classification Search
CPC ....... G06Q 10/10; G01L 5/0052; G07C 5/008
USPC ................... 701/1, 301, 31.9, 32.2; 340/8.1; 702/113; 705/4
See application file for complete search history.

(56) References Cited

U.S. PATENT DOCUMENTS 7,359,821 B1 * 4/2008 Smith ................... G01L 5/0052
702/113
7,809,586 B2 * 10/2010 Wahlbin ................ G06Q 10/10
705/4
(Continued)

FOREIGN PATENT DOCUMENTS

CN 102034013 B 10/2012

Primary Examiner — Thomas G Black
Assistant Examiner — Wae Louie
(74) Attorney, Agent, or Firm — Finnegan, Henderson, Farabow, Garrett & Dunner, L.L.P.

(57) ABSTRACT

A method and system for crash analysis of one or more vehicles involved in a crash is disclosed. The method may comprise capturing data samples such as a plurality of GPS samples and a plurality of acceleration samples. The method may further comprise generating a trajectory. Moreover, the method may comprise segmenting the trajectory into a macro level segment and further into a micro level segment. The method may further comprise computing at least one macro level score based on the plurality of acceleration samples and the GPS samples. Based on the at least one macro level score, the method may be configured to compute a crash responsibility score for ascertaining crash responsibility.

12 Claims, 6 Drawing Sheets

(51) Int. Cl.
*B60R 21/00* (2006.01)
*B60R 21/0132* (2006.01)

(56) References Cited

U.S. PATENT DOCUMENTS

| | | | | |
|---|---|---|---|---|
| 8,612,170 B2* | 12/2013 | Smith | ............... | G07C 5/002 |
| | | | | 702/113 |
| 8,799,034 B1* | 8/2014 | Brandmaier | ............ | G06Q 40/08 |
| | | | | 705/4 |
| 9,182,942 B2* | 11/2015 | Kelly | ............ | G06F 7/00 |
| 2012/0146766 A1* | 6/2012 | Geisler | ............ | G07C 5/008 |
| | | | | 340/8.1 |
| 2015/0317801 A1* | 11/2015 | Bentley | ............ | H04N 7/181 |
| | | | | 382/107 |
| 2016/0110931 A1* | 4/2016 | Chowdhury | ......... | G08G 1/0112 |
| | | | | 701/1 |

\* cited by examiner

A1-A2, A2-A3, B1-B2 and B2-B3: Macro trip level segments

METHOD AND SYSTEM FOR PERFORMING CRASH ANALYSIS OF ONE OR MORE VEHICLES

CROSS-REFERENCE TO RELATED APPLICATIONS AND PRIORITY

This U.S. patent application claims the benefit of priority under 35 U.S.C. §119 to India Patent Application No. 3331/MUM/2014, filed on Oct. 18, 2014. The aforementioned application is incorporated herein by reference in its entirety.

TECHNICAL FIELD

The present disclosure described herein, in general, relates to systems and methods for crash analysis, more particularly ascertaining crash responsibility based on the crash analysis of one or more vehicles involved in a crash.

BACKGROUND

Road accident is an unplanned event occurring suddenly, unexpectedly and inadvertently in an unforeseen circumstance. Rapid growth of population coupled with increased economic activities has favored tremendous growth of motor vehicles posing as one of primary factors responsible for the road accidents/crash. The highway network is accelerated at a fast rate and the safety of vehicular movements becomes a concern for everybody due to reporting of loss of lives and properties along with fatal injuries and periodical obstruction of traffic flow. National highways provide the efficient mobility and accessibility function. The road accidents/crashes are essentially caused by interactions of the vehicles, road users and roadway conditions. Each of these basic elements comprises a number of sub elements like pavement characteristics, geometric features, traffic characteristics, road user's behavior, vehicle design, driver's characteristics and environmental aspects.

Today, numerous "black box" technologies exist to provide road accident investigators, insurance companies and legal counsel with significant information regarding a car accident. The black box technologies may include aftermarket solutions that may include GPS capabilities, video capture, and storage of crash data. Furthermore, the black box technologies are able to create 3D animated model of accident/crash for legal and insurance claim settlement purposes. Such existing solutions are mostly from representation purpose and not from an analysis point of view. Data recovered from devices/sensors present on the car in case of single car involved in the accident/crash or two cars involved in collision are subjected to study the nature of accident/crash. With advances in sensor technology it is possible to acquire data from moving car. Further, few tools for recreating trajectory of the car of 2D virtual recreation of the accident/crash exists, however are restricted to assist subjective analysis by human.

SUMMARY

This summary is provided to introduce aspects related to systems and methods for performing crash analysis of one or more vehicles involved in a crash and the aspects are further described below in the detailed description. This summary is not intended to identify essential features of the claimed disclosure nor is it intended for use in determining or limiting the scope of the claimed disclosure.

In one implementation, a method for performing crash analysis of one or more vehicles involved in a crash is disclosed. The method may comprise receiving a plurality of GPS samples associated with a vehicle at a predefined time interval. The method may further comprise generating a trajectory for the vehicle, wherein the trajectory is generated by tracing the plurality of GPS samples. Furthermore, the method may comprise segmenting the trajectory into one or more macro level segments, wherein each macro level segment is further segmented into one or more micro level segments. Furthermore, the method may comprise receiving a plurality of acceleration samples for at least one micro level segment of each macro level segment. In the next step the method may comprise computing at least one micro level segment score corresponding to at least one micro level segment. The at least one micro level segment score is computed based upon the plurality of acceleration samples. The method may further comprise computing at least one macro level score corresponding to at least one macro level segment, wherein the at least one macro level score is computed based upon one of the at least one micro level segment score and a reference speed of the vehicle, and wherein the reference speed is indicative of a speed measured corresponding to the at least one macro level segment and an adjacent macro level segment of the at least one macro level segment. Finally, the method may comprise determining a crash responsibility score based upon the at least one macro level score, wherein the crash responsibility score facilitates in performing crash analysis of the vehicle.

In another implementation, a system for performing crash analysis of one or more vehicles involved in a crash is disclosed. The system may comprise a processor and a memory coupled to the processor, wherein the processor is capable of executing a plurality of modules stored in the memory, and wherein the plurality of module comprises a trajectory module, a scoring module, and a crash analysis module. The trajectory module may be configured to receive a plurality of GPS samples associated with a vehicle at a predefined time interval. The trajectory module may further be configured to generate a trajectory for the vehicle, wherein the trajectory is generated by tracing the plurality of GPS samples. Further, the trajectory module may further segment the trajectory into one or more macro level segments. Each macro level segment is further segmented into one or more micro level segments. The scoring module may be configured to receive a plurality of acceleration samples for at least one micro level segment of each macro level segment. The scoring module may further be configured to compute at least one micro level segment score corresponding to at least one micro level segment, wherein the at least one micro level segment score is computed based upon the plurality of acceleration samples and at least one macro level score corresponding to at least one macro level segment. Further, the at least one macro level score is computed based upon one of the at least one micro level segment score and a reference speed of the vehicle. The reference speed is indicative of a speed measured corresponding to the at least one macro level segment and an adjacent macro level segment of the at least one macro level segment. The crash analysis module may be configured to determine a crash responsibility score based upon the at least one macro level score. The crash responsibility score may further facilitates in performing crash analysis of the vehicle.

In yet another implementation, a non-transitory computer readable medium embodying a program executable in a computing device for performing crash analysis of one or more vehicles involved in a crash is disclosed. The program may comprise a program code for receiving a plurality of GPS samples associated with a vehicle at a predefined time interval. The computer program may further comprise a program code for receiving a plurality of GPS samples associated with a vehicle at a predefined time interval. The computer program may further comprise a program code for segmenting the trajectory into one or more macro level segments, wherein each macro level segment is further segmented into one or more micro level segments. Furthermore, the program may comprise a program code for receiving a plurality of acceleration samples for at least one micro level segment of each macro level segment. The program may further comprise a program code for computing at least one micro level segment score corresponding to at least one micro level segment, wherein the at least one micro level segment score is computed based upon the plurality of acceleration samples and at least one macro level score corresponding to at least one macro level segment, wherein the at least one macro level score is computed based upon one of the at least one micro level segment score and a reference speed of the vehicle, and wherein the reference speed is indicative of a speed measured corresponding to the at least one macro level segment and an adjacent macro level segment of the at least one macro level segment. The program may further comprise a program code for determining a crash responsibility score based upon the at least one macro level score, wherein the crash responsibility score facilitates in performing crash analysis of the vehicle.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

While aspects of the described system for crash analysis of one or more vehicles involved in a crash may be implemented in any number of different computing systems, environments, and/or configurations, the embodiments are described in the context of the following exemplary system.

Figure 1:
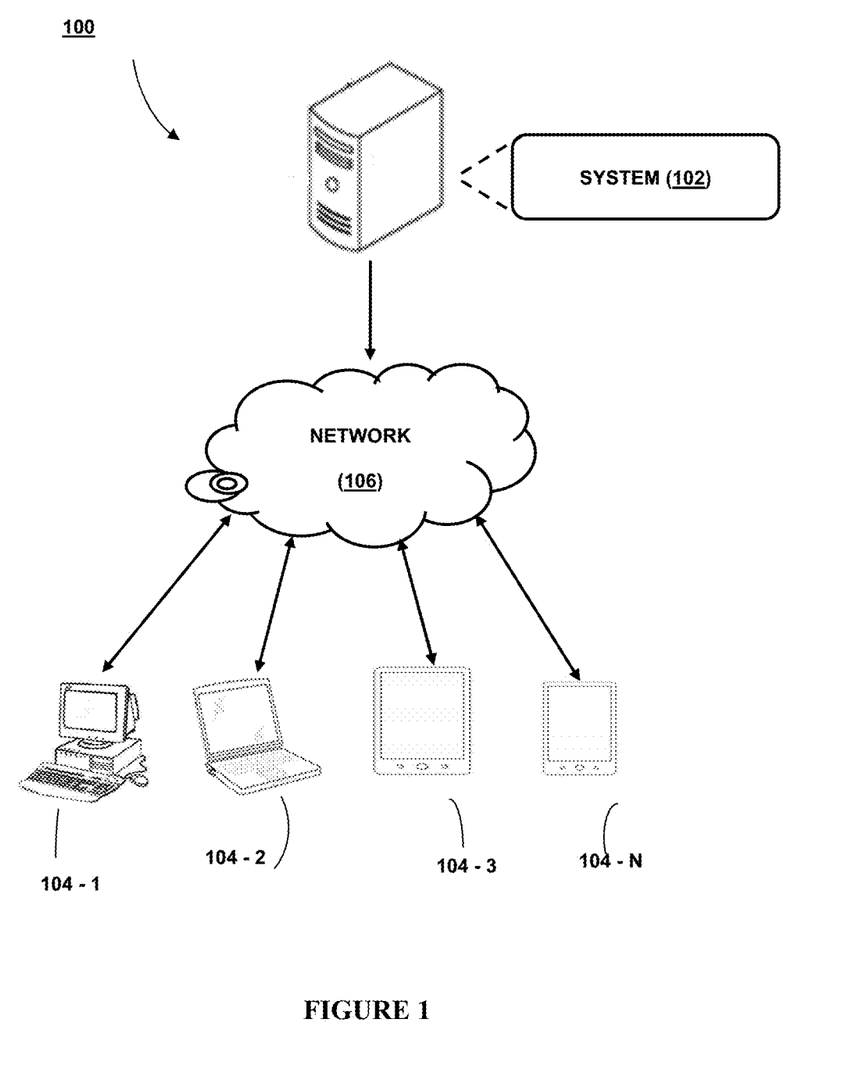
FIG. 1 illustrates a network implementation of a system for crash analysis of one or more vehicles involved in a crash, in accordance with an embodiment of the present disclosure.

Although the present disclosure is explained considering that the system 102 is implemented as a server, it may be understood that the system 102 may also be implemented in a variety of computing systems, such as a laptop computer, a desktop computer, a notebook, a workstation, a mainframe computer, a network server, and the like. In one implementation, the system 102 may be implemented in a cloud-based environment. It will be understood that the system 102 may be accessed by multiple users through one or more user devices 104-1, 104-2 . . . 104-N, collectively also referred to as a user device 104, or a user 104, hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
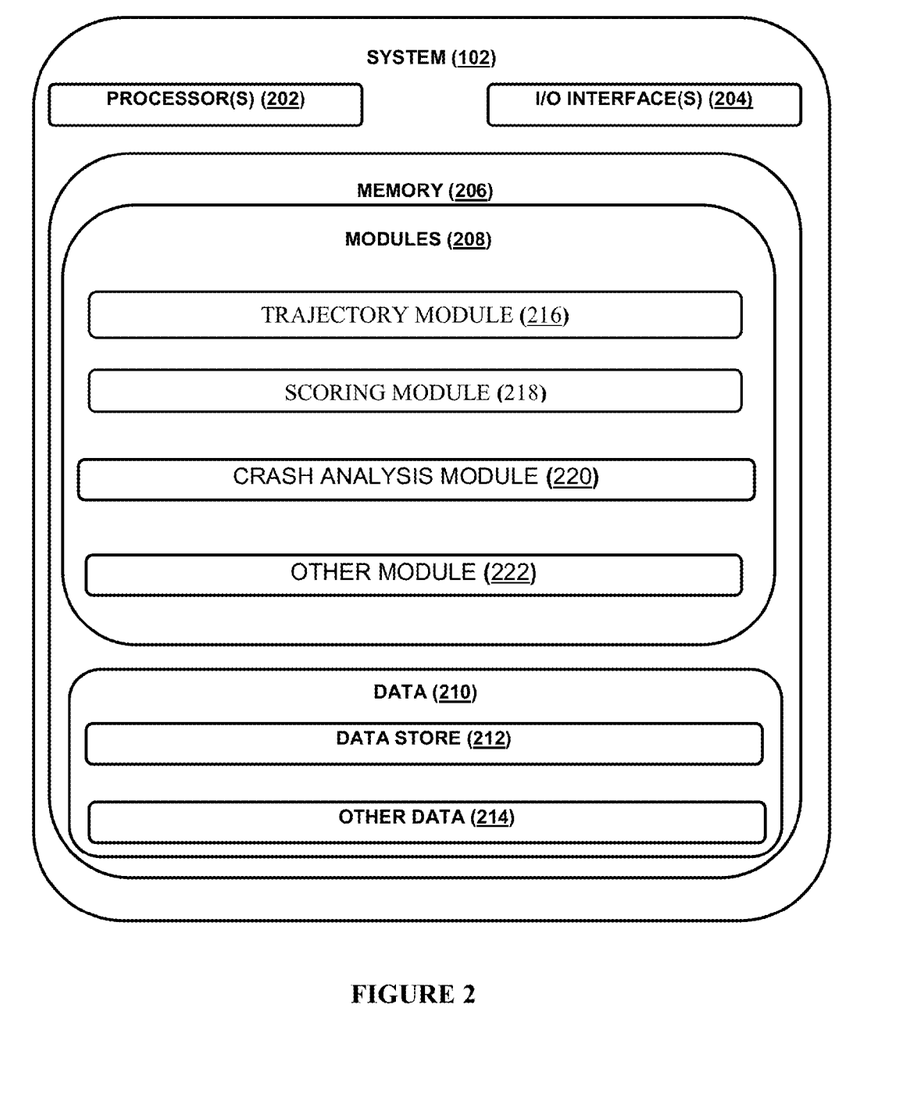
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a trajectory module 216, a scoring module 218, a crash analysis module 220 and other module 222. The other module 222 may include programs or coded instructions that supplement applications and functions of the system 102.

The data 210, amongst other things, serves as a repository for storing data processed, received, and generated by one or more of the modules 208. The data 210 may also include a data store 212 and other data 214. The other data 214 may include data generated as a result of the execution of one or more modules in the other module 228.

In one implementation, at first, a user may use the user device 104 to access the system 102 via the I/O interface 204. The user may register themselves using the I/O interface 204 in order to use the system 102. The working of the system 102 using the plurality of modules 208 along with other components is explained in detail referring to FIG. 3 as explained below.

Figure 3:
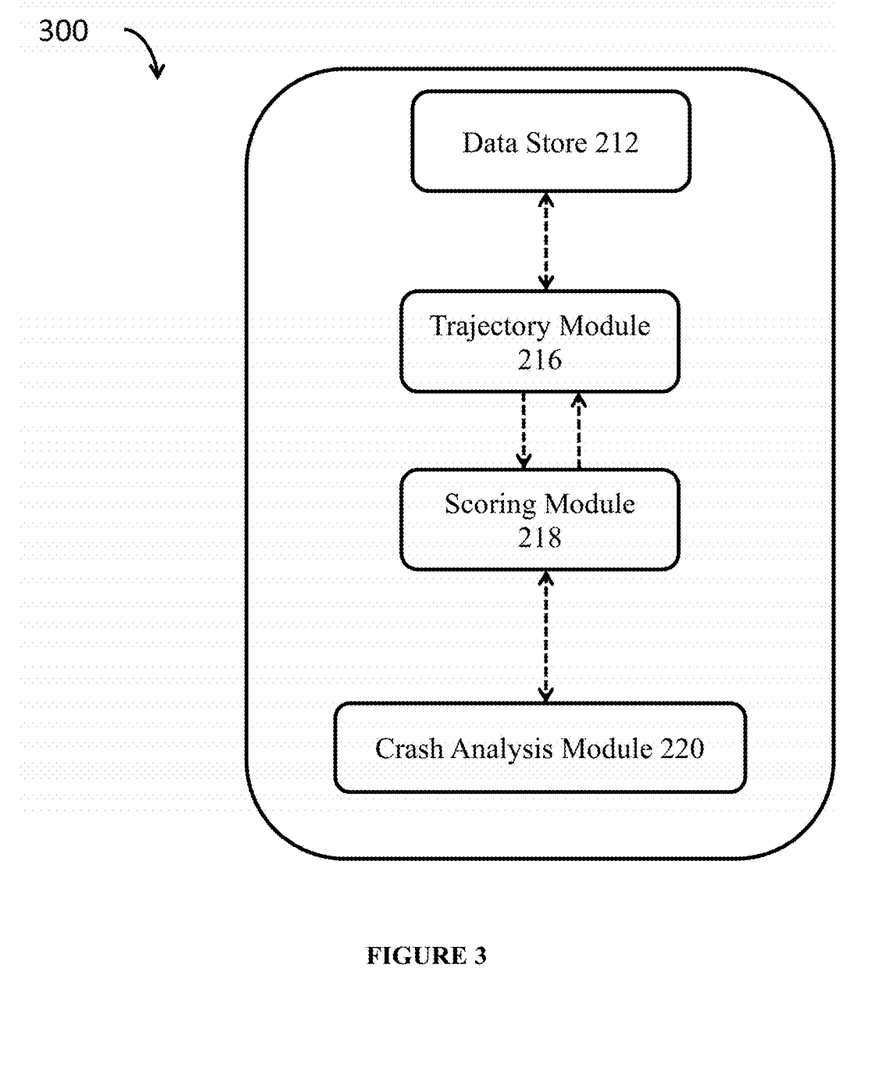
FIG. 3 illustrates architecture of the system for crash analysis, in accordance with an embodiment of the present disclosure.

Referring now to FIG. 3, in an embodiment, architecture 300 of the system for crash analysis involved in crash is shown. The architecture 300 may comprise of a data store 212, a trajectory module 216, a scoring module 218 and a crash analysis module 220. The trajectory module 216 may be configured to receive data samples from sensors integrated with one or more vehicles. In an embodiment, the system and method may be explained by using minimal number of sensors to receive data samples indicative of crash data associated with the one or more vehicles involved in the crash. The crash data may further comprise data related to speed, location, and acceleration of the vehicle at a particular location during traverse of the vehicle. The data samples i.e. crash data received from the sensors may be stored in the data store 212.

In the embodiment a GPS sensor may be adapted to sense the speed and location of the one or more vehicles. Furthermore, a 3 axis accelerometer may also be adapted to sense the acceleration of the one or more moving vehicles about three axes. In an aspect of the present disclosure, the basic purpose of the crash analysis disclosed herein is to make use of minimum number of sensors for the crash analysis. As shown in the FIG. 3, the data store 212 may be adapted to store the GPS samples and the acceleration samples received from the GPS sensor and the 3 axis accelerometer respectively associated with the vehicle. Upon receiving the data samples from the GPS sensor and the 3 axis accelerometer by the data store 212, the trajectory module 220 may be configured to generate a trajectory of the one or more vehicles, wherein the trajectory module 216 may be connected to the data store 212. The trajectory generated may be based on the GPS data samples. Furthermore, the trajectory module 216 may be configured to segment the trajectory into one or more macro level segments. Further, the trajectory module may be configured to segment the one or more macro level segment into one or more micro level segments. In next step, the scoring module 218 may be configured to compute at least one micro level score and at least one macro level score. In the final stage, the crash analysis module 220 may be configured to compute crash responsibility score based on at least one of the micro level score and the macro level score, based on which the crash analysis may be performed to identify which vehicle was at fault or responsible for the crash. It is important to note that, crash may be between two or more vehicles or only single vehicle may be involved wherein the said single vehicle may crash onto a stationary object.

In an embodiment, a series of scores for each vehicle may be generated from few minutes before the crash till the actual crash time. Hence the series of scores may help visualize driving behavior for each vehicle involved in the crash chronologically till the actual crash. Further, the present disclosure may adapt weighted moving average (WMA) having specific meaning of weights that increase in arithmetical progression. The WMA may help in accommodate a fact that bad driving closer to the crash time may have more responsibility for the crash. Moreover, the system and method may be enabled to analyze driving behavior in a decoupled manner so as to achieve different scores for lateral, longitudinal and vertical acceleration profile of the one or more vehicles. Additionally, there may exist three cases in case of the crash such as a) generic situation in which two cars/vehicles are colliding with each other, b) single car/vehicle breakdown, and c) Single car/vehicle or hitting another stationary object. Taking these cases into account the score named a Crash Responsibility Score (CRS) may be computed to ascertain the responsibility. The computation of the CRS may be further explained in detail as discussed in following description.

In an embodiment, the trajectory module 220 may be configured to generate the trajectory for the one or more vehicles involved in the crash. In the first step, based on the GPS samples received at the Data store 212, longitudinal and latitudinal readings associated with the location of the vehicle may be captured for a predefined time interval. Further, simultaneously the acceleration samples may also be captured for the same time interval. In other word, between two consecutive GPS samples, number of acceleration samples may exist which may be captured by the GPS sensor and stored in the data store 212. For example, (a1$i$, a2$i$, a3$i$ . . . an$i$) be the acceleration samples, where 'a' indicates 3-axis acceleration vector (X, Y, Z) and index 'i' corresponds to $i^{th}$ sample of the GPS sample. The three axis acceleration may be explained in detail by referring FIG. 4.

Figure 4:
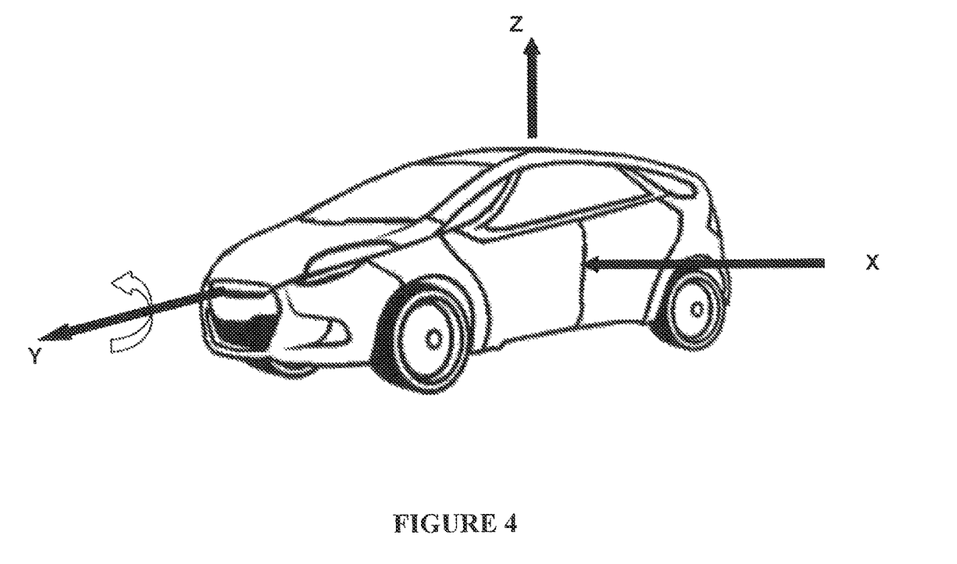
FIG. 4 illustrates Coordinate System for 3 axis accelerometer with respect to the vehicle, in accordance with an embodiment of the present disclosure.

Referring to the FIG. 4 is a co-ordinate system with respect to the vehicle. As shown in the FIG. 4, X-axis may indicate a lateral acceleration, Y-axis may indicate a longitudinal acceleration, and Z-axis may indicate a vertical acceleration the vehicle. In an embodiment, the GPS sample and the acceleration sample may be captured few minutes before the actual crash. In next step, based on the acceleration samples at three axes and the GPS samples, a composite score at the at least one micro level segment may be computed. The composite score may indicative of road quality, vehicle state & driving pattern associated with the vehicle. Further, based on the GPS samples, the speed of the vehicle at each consecutive macro level segment may be captured. Using the speed at the macro level segment and the composite score the CRS may be computed using series of formulae as described in the following description referring to FIG. 5.

Figure 5:
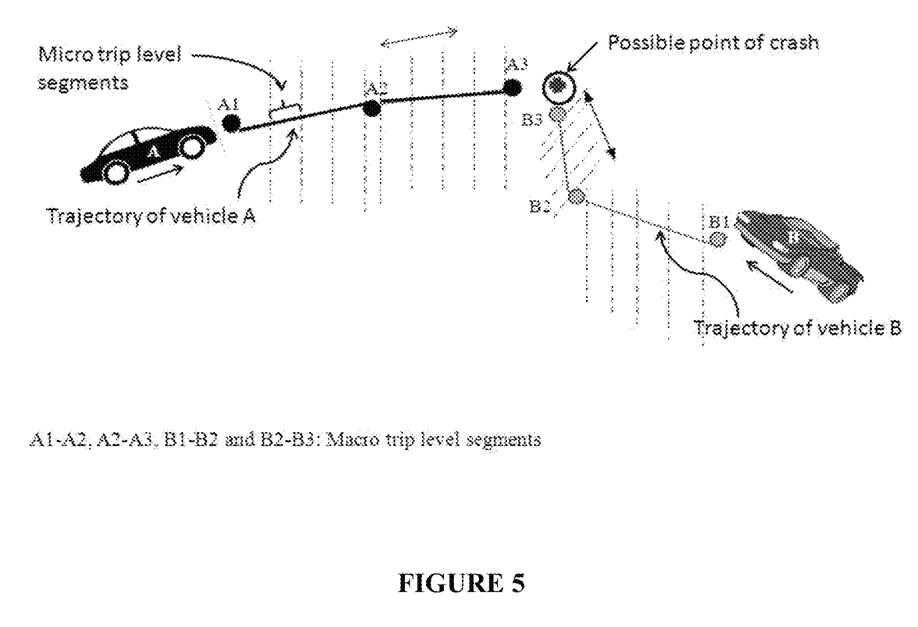
FIG. 5 illustrates model based crash recreation for each vehicle.

Referring to the FIG. 5, the trajectory of the vehicle A and the trajectory of the vehicle B may be generated using the GPS samples and the acceleration samples for the respective vehicles. In an embodiment, let $a_i=(a_x, a_y, a_z)_i$, where X may be acceleration in the lateral direction, Y may be acceleration in the longitudinal direction and Z may be acceleration in the vertical direction of the traverse of the vehicle A and the vehicle B. further, as shown in the FIG. 5, points A1, A2 and A3 may indicate points along the traverse of the vehicle A, wherein A1 to A2 and A2 to A3 may indicate macro level segments. Similarly, points B1, B2 and B3 may indicate macro level segment for the vehicle B. Furthermore, FIG. 5 shows micro level segments formed over the macro level segments for each vehicle. Also, possible point of crash may be seen from the FIG. 5. Hence according to the embodiment, for N accelerometer samples in the micro level segment e.g. at 20 Hz sampling, N=20, various score may be computed as follows:

$$\text{First score} = \frac{\sum_{|a_x|>0.3g} \min(|a_x|, g)}{Ng} \quad \text{Equation (1)}$$

$$\text{Second score} = \frac{\sum_{|a_y|>0.3g} \min(|a_y|, g)}{Ng} \quad \text{Equation (2)}$$

$$\text{Third score} = \frac{\sum_{|a_z|>0.3g} \min(|a_z|, g)}{Ng} \quad \text{Equation (3)}$$

Using equations 1, 2 and 3, the composite score at each micro level segment (MT), referred as a first macro level score (MT) may be computed using an equation (5)

$$MT = [\omega_{first\ score}*\text{First Score}] + [\omega_{second\ score}*\text{Second Score}] + [\omega_{third\ score}*\text{Third Score}] \quad \text{Equation (5)}$$

Where $[\omega_{first\ score} + \omega_{second\ score} + \omega_{third\ score}] = 1$ and all weights are positive.

In an embodiment, all the weights may be determined by making judicious judgment about the driver's relative influence on each score. For example, the common understanding is represented in the following table 1.

TABLE 1

| EVENT | RELATED SCORE | DRIVER DEPENDANCY | RISK RELEVANCE |
|---|---|---|---|
| High acceleration | Second score | High | Medium |
| Hard brake | Second score | Medium | High |
| Cornering | First score | High | Medium |
| Swerving | First score | Medium | Low |
| Road roughness | Third score | Low | Low |
| Speeding beyond location based speed limit | Third score | High | High |

Thus, analyzing the table 1, the relative weights may be set as—

TABLE 2

| Weights | Relevance |
|---|---|
| $W_{second\ score}$ | HIGH |
| $W_{first\ score}$ | MEDIUM |
| $W_{third\ score}$ | LOW |

In next step, for each macro level segment, there may exists two speed readings captured from the GPS sensor i.e. at start and end of each micro level segment, and may be denoted by macro level segment speed by $v_{macro}=(v_{start}+v_{end})/2$. For $j^{th}$ macrotrip $v_{macro}$ may be denoted by $v_{macro}(j)$. Hence, for the macro level segment j a speed score denoted by $MacVScore_j = \min\{1, v_{macro}(j)/v_{limit}\}$ may be computed, where $v_{limit}$ may indicative of the speed limit for the location in which the crash has taken place. The composite score and the $MacVScore_j$ may be denoted on the macro level segment of the trajectory generated for the vehicles. A 2D trajectory may be generated for the vehicle A and the vehicle B as shown in the FIG. 5 using the GPS samples as follows—
For the vehicle A—
Initial location may be assumed to be (0, 0) i.e. $x^0=0$, $y_0=0$. Subsequent (x, y) points may be calculated as $$x_i = x_{i-1} + R_e(lon_i(1) - lon_{i-1}(1))\cos((lat_i(1) + lat_{i-1}(1))/2),$$

$$y_i = y_{i-1} + R_e(lat_i(1) - lat_{i-1}(1))$$

Where, $R_e = 6378100$ m is earth's radius and all calculations and data captured may be in radian.
For the vehicle B—
Using the GPS samples, for the vehicle A denoted by $lat_i(1)$, $lon_i(1)$ and the vehicle B may be denoted by $lat_i(2)$, $lon_i(2)$. Only initial location may be calculated differently using the GPS samples from both the vehicles to determine initial position. Then next locations may be determined recursively.

$$\bar{x}_0 = R_e(lon_0(2) - lon_0(1))\cos((lat_0(2) + lat_0(1))/2),$$

$$\bar{y}_0 = R_e(lat_0(2) - lat_0(1))$$

(Initial position)
Thus subsequent points:

$$\bar{x}_i = \bar{x}_{i-1} + R_e(lon_i(2) - lon_{i-1}(2))\cos((lat_i(2) + lat_{i-1}(2))/2),$$

$$\bar{y}_i = \bar{y}_{i-1} + R_e(lat_i(2) - lat_{i-1}(2))$$

Hence, on the XY plane representative plot may be generated as given in the FIG. 5 using (x, y) and $(\bar{x},\bar{y})$ with the macro level segment and the micro level segment scores for each vehicle. Hence given two vehicles crash data, a graphic representation like the FIG. 5 may be generated.

Now, in the next step, to compute the CRS for each vehicle, i macro level segment, which means k microtrips, where k=integer (k/Fs$_{GPS}$), Fs$_{GPS}$=sampling rate of the GPS sensor, and further k micro level segment may be computed before the instance of the crash. Typically, k=15-300 may be considered. From the data captured, the micro level segment score as MT may be computed. Based on the scores the CRS_acc may be computed from acceleration data (CRS_acc) for each vehicle for trip T containing k micro level segments i.e. trip duration T=k/Fs, where Fs is sampling rate of the 3 axis accelerometer.

$$CRS\_acc = \sum_{i=1}^{k} w_i MT_i \quad \text{Equation (6)}$$

In the equation (6), $w_i$ is indicative of the weights associated with the importance of the $i^{th}$ micro level segment with respect to the instance of the crash. That means, the micro level segment closer to the crash may get more weightage.

$$w_i = \frac{2i}{k(k+1)} \quad \text{Equation (7)}$$

Then from velocity based scores MacVScore, the CRS from acceleration data (CRS_speed), further referred to as a second macro level score for each vehicle involved in the crash by using equation (8) may be computed.

$$\text{CRS\_speed} = \sum_{i=1}^{l} wm_i \cdot MacVScore_i \quad \text{Equation (8)}$$

Where, $wm_i$ is the weights associated with the importance of i-th macro level segment with respect to the instance of the crash. That means, the macro levels segment closer to the crash may get more weightage.

$$wm_i = \frac{2i}{l(l+1)} \quad \text{Equation (9)}$$

Using CRS_acc and CRS_speed, the CRS may be computed as $$CRS = \omega_{acc} * CRS\_acc + \omega_{speed} * CRS\_speed \quad \text{Equation (10)}$$

Where, $w_{acc} + w_{speed} = 1$, $w_{speed} w_{acc} > 0$ may be specified by configuration settings at server side.

In an aspect of the present disclosure, the CRS for each vehicle may be computed using the equation 10. The CRS computed for each vehicle may represent responsibility score of each vehicle involved in the crash. Value of the CRS may vary between 0 to 1, with 1 indicating full responsible for the crash and 0 indicating no responsibility. In simpler words higher score imply higher responsibility. Further, the CRS may similarly be computed for the other vehicle involved in the crash by performing same steps as discussed earlier. Hence the CRS may assist a crash analyst to arrive at a conclusion which vehicle was at fault with respect to other vehicle based on the CRS.

Exemplary embodiments discussed above may provide certain advantages. Though not required to practice aspects of the disclosure, these advantages may include those provided by the following features.

Some embodiments of the present disclosure allow analysis of the crash of the one or more vehicles based on minimal number of sensor data.

Some embodiments of the present disclosure that allow responsibility analysis at each micro level as well as macro level segment of the trajectory of the vehicle traverse by facilitating plotting of the scores such as the at least one macro level score and the CRS at the macro level segments on the trajectory for clear understanding and analysis of the crash.

Some embodiments of the present disclosure facilitate easy ascertainment of the responsibility of the vehicles at the crash.

Figure 6:
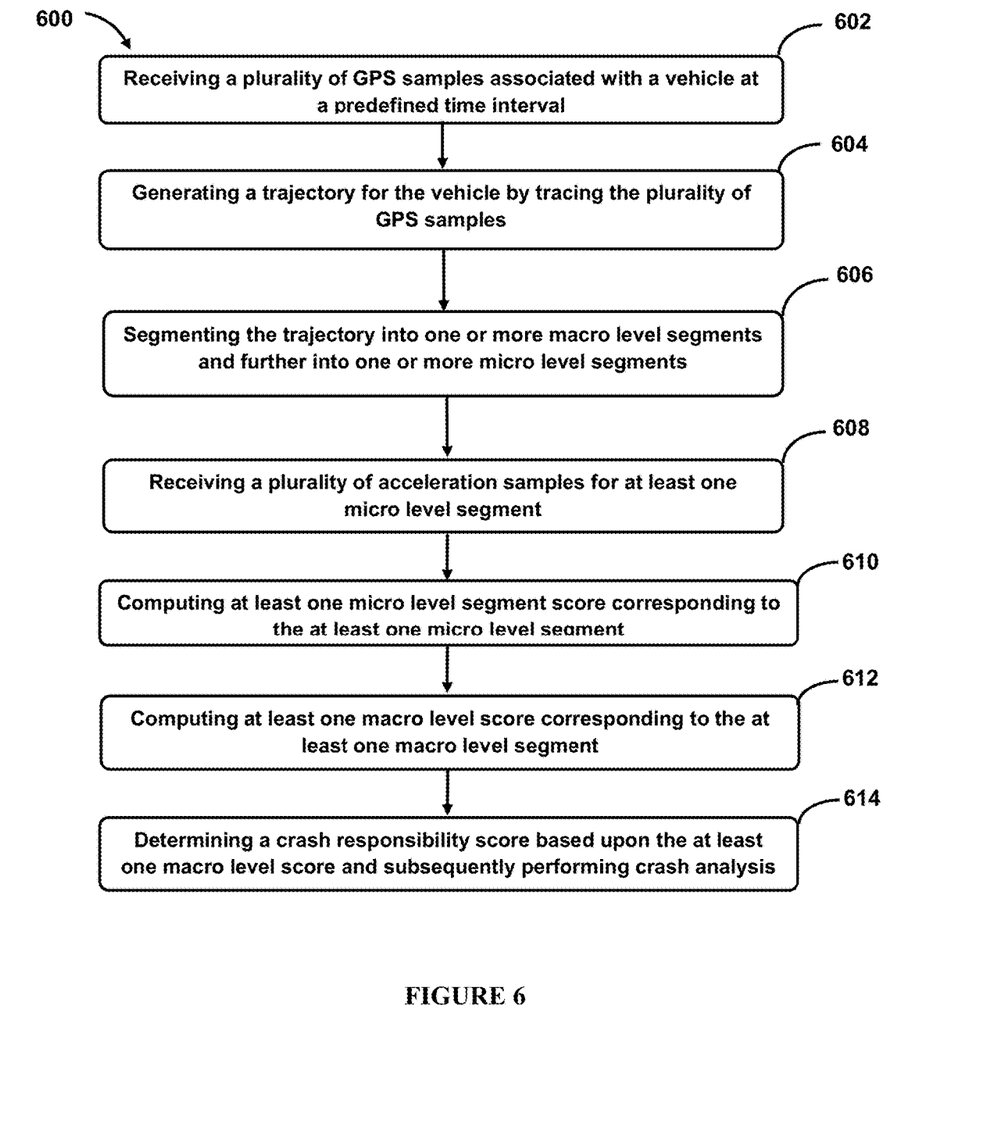
FIG. 6 illustrates a method for the crash analysis of one or more vehicles involved in a crash, in accordance with an embodiment of the present disclosure.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method can be implemented in any suitable hardware, software, firmware, or combination thereof. However, for ease of explanation, in the embodiments described below, the method 600 may be considered to be implemented in the above described system 102.

At block 602, the plurality of GPS samples associated with the vehicle at a predefined time interval may be received and subsequently stored in the data store 212.

At block 604, a trajectory may be by tracing the plurality of GPS samples.

At block 606, upon generation of the trajectory, the trajectory may be segmented into one or more macro level segments and further into one or more micro level segments.

At block 608, the plurality of acceleration samples for at least one micro level segment may be received and subsequently stored in the data store 212.

At block 610, at least one micro level segment score corresponding to the at least one micro level segment may be computed.

At block 612, at least one macro level score corresponding to the at least one macro level segment may be computed.

At block 614, a crash responsibility score based upon the at least one macro level score may be determined and subsequently a crash analysis may be performed.

Although implementations for methods and systems for crash analysis of one or more vehicles involved in a crash have been described in language specific to structural features and/or methods, it is to be understood that the appended claims are not necessarily limited to the specific features or methods described.

What is claimed is:

1. A computer-implemented method for performing crash analysis of one or more vehicles involved in a crash, the method comprising:
periodically receiving, by a processor, a plurality of GPS samples associated with a vehicle;
generating, by the processor, a trajectory for the vehicle by tracing the plurality of GPS samples;
segmenting, by the processor, the trajectory into one or more macro level segments, wherein each macro level segment is segmented into one or more micro level segments;
receiving, by the processor, a plurality of acceleration samples for at least one micro level segment of each macro level segment;
computing, by the processor:
at least one micro level segment score corresponding to at least one micro level segment based upon the acceleration samples at three axes and the plurality of GPS samples, wherein the plurality of GPS samples and the plurality acceleration samples are received from a GPS sensor and a 3-axis accelerometer sensor associated with the vehicle, and
at least one macro level segment score corresponding to at least one macro level segment based upon the micro level segment score or a reference speed of the vehicle, wherein the reference speed is indicative of a speed measured corresponding to the at least one macro level segment and a macro level segment adjacent to the at least one macro level segment; and
determining, by the processor, a crash responsibility score based upon the at least one macro level score, the crash responsibility score for performing crash analysis of the vehicle, wherein the crash responsibility score represent responsibility score of each vehicle involved in the crash, and wherein the crash responsibility score comprises a numerical value within a range of 0 to 1, wherein a 0 numerical value indicates no responsibility and a 1 numerical value indicates full responsibility of the vehicle involved in the crash.

2. The computer-implemented method of claim 1, wherein the at least one micro level segment score includes at least one of a first score, a second score, and a third score, and wherein the first score is indicative of longitudinal acceleration of the vehicle, the second score is indicative of lateral acceleration of the vehicle, and the third score is indicative of vertical acceleration of the vehicle.

3. The computer-implemented method of claim 2, wherein the at least one macro level score is computed based upon summation of the first score, the second score, and the third score.

4. The computer-implemented method of claim 1, wherein the at least one micro level score, the at least one macro level score, and the crash responsibility score are displayed on the trajectory.

5. A computer-implemented system for performing crash analysis of one or more vehicles involved in a crash, the system comprising:
    a processor; and
    a memory coupled to the processor, wherein the processor executes a plurality of modules stored in the memory, the plurality of modules comprising:
        a trajectory module configured to
            periodically receive a plurality of GPS samples associated with a vehicle;
            generate a trajectory for the vehicle by tracing the plurality of GPS samples; and
            segment the trajectory into one or more macro level segments, wherein each macro level segment is segmented into one or more micro level segments;
        a scoring module configured to
            receive a plurality of acceleration samples for at least one micro level segment of each macro level segment; and
            compute:
                at least one micro level segment score corresponding to at least one micro level segment based upon the acceleration samples at three axes and the plurality of GPS samples, and
                at least one macro level segment score corresponding to at least one macro level segment based upon the at least one micro level segment score or a reference speed of the vehicle, wherein the reference speed is indicative of a speed measured corresponding to the at least one macro level segment and a macro level segment adjacent to the at least one macro level segment; and
        a crash analysis module configured to
            determine a crash responsibility score based upon the at least one macro level score, the crash responsibility score for performing crash analysis of the vehicle, wherein the crash responsibility score represent responsibility score of each vehicle involved in the crash, and wherein the crash responsibility score comprises a numerical value within a range of 0 to 1, wherein a 0 numerical value indicates no responsibility and a 1 numerical value indicates full responsibility of the vehicle involved in the crash; and
    wherein the processor executes the trajectory module to receive the plurality of GPS samples and the plurality acceleration samples from a GPS sensor and a 3-axis accelerometer sensor associated with the vehicle.

6. The computer-implemented system of claim 5, wherein the at least one micro level segment score includes at least one of a first score, a second score, and a third score, and wherein the first score is indicative of longitudinal acceleration of the vehicle, the second score is indicative of lateral acceleration of the vehicle, and the third score is indicative of vertical acceleration of the vehicle.

7. The computer-implemented system of claim 6, wherein the processor executes the scoring module to compute the at least one macro level score based upon summation of the first score, the second score, and the third score.

8. The computer-implemented system of claim 5, wherein the at least one micro level score, the at least one macro level score, and the crash responsibility score are displayed on the trajectory.

9. A non-transitory computer readable medium embodying a program executable in a computing device for crash analysis of one or more vehicles involved in a crash, the program comprising:
    a program code for periodically receiving a plurality of GPS samples associated with a vehicle;
    a program code generating a trajectory for the vehicle by tracing the plurality of GPS samples;
    a program code for segmenting the trajectory into one or more macro level segments, wherein each macro level segment is segmented into one or more micro level segments;
    a program code for receiving a plurality of acceleration samples for at least one micro level segment of each macro level segment;
    a program code for computing:
        at least one micro level segment score corresponding to at least one micro level segment based upon the acceleration samples at three axes and the plurality of GPS samples, wherein the program further comprises a program code to receive the plurality of GPS samples and the plurality acceleration samples from a GPS sensor and a 3-axis accelerometer sensor associated with the vehicle, and
        at least one macro level segment score corresponding to at least one macro level segment based upon the micro level segment score or a reference speed of the vehicle, wherein the reference speed is indicative of a speed measured corresponding to the at least one macro level segment and a macro level segment adjacent to the at least one macro level segment; and
    a program code for determining a crash responsibility score based upon the at least one macro level score, the crash responsibility score for performing crash analysis of the vehicle, wherein the crash responsibility score represent responsibility score of each vehicle involved in the crash, and wherein the crash responsibility score comprises a numerical value within a range of 0 to 1, wherein a 0 numerical value indicates no responsibility and a 1 numerical value indicates full responsibility of the vehicle involved in the crash.

10. The medium of claim 9, wherein the at least one micro level segment score includes at least one of a first score, a second score, and a third score, and wherein the first score is indicative of longitudinal acceleration of the vehicle, the second score is indicative of lateral acceleration of the vehicle, and the third score is indicative of vertical acceleration of the vehicle.

11. The medium of claim 10, wherein the program further comprises a program code to compute the at least one macro level score based upon summation of the first score, the second score, and the third score.

12. The medium of claim 9, wherein the at least one micro level score, the at least one macro level score, and the crash responsibility score are displayed on the trajectory.

* * * * *